Figure 1:
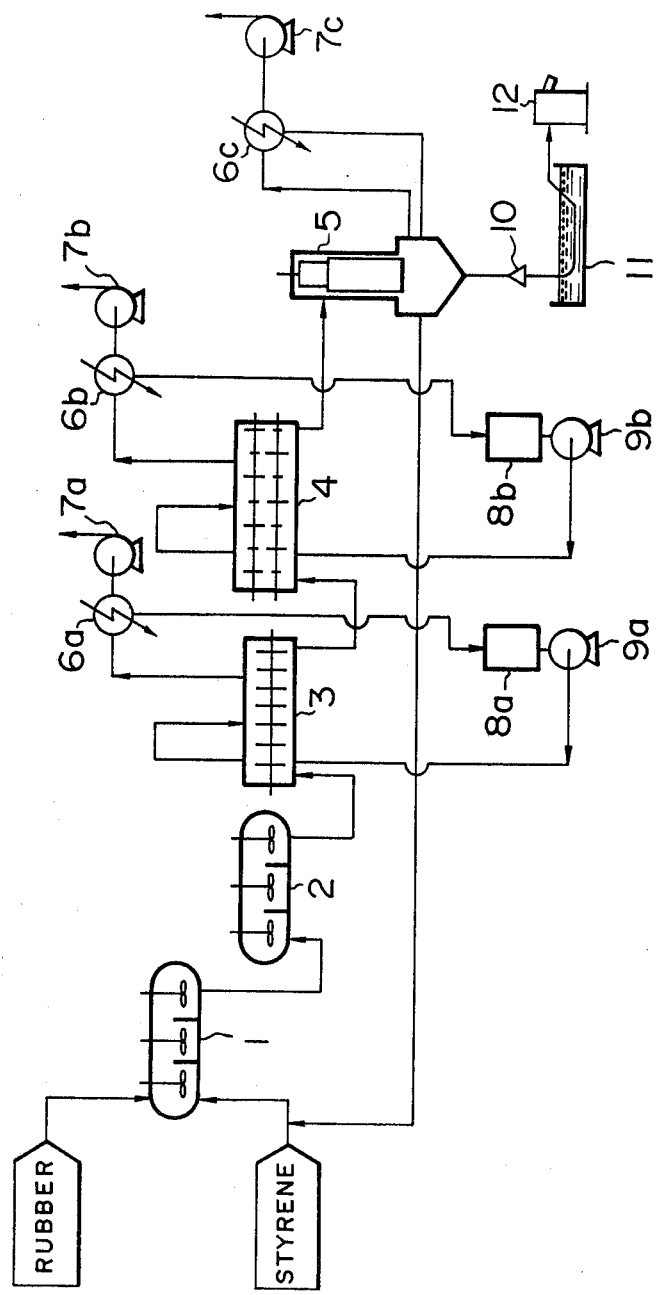

United States Patent [19] [11] 4,419,488
Fukumoto et al. [45] Dec. 6, 1983

[54] PROCESS FOR CONTINUOUS PRODUCTION OF HIGH IMPACT POLYSTYRENE

[75] Inventors: Chihiro Fukumoto, Kodaira; Tokinobu Furukawa; Chikao Oda, both of Kudamatsu, all of Japan

[73] Assignee: Hitachi, Ltd., Tokyo, Japan

[21] Appl. No.: 366,303

[22] Filed: Apr. 7, 1982

[30] Foreign Application Priority Data

Apr. 15, 1981 [JP] Japan ................................. 56-55568

[51] Int. Cl.³ .................... C08F 279/00; C08F 279/02
[52] U.S. Cl. ...................................... 525/53; 525/289; 525/292; 525/302; 525/306; 525/313; 525/314
[58] Field of Search ................. 525/53, 289, 292, 302, 525/313, 314, 306

[56] References Cited

U.S. PATENT DOCUMENTS 3,945,976  3/1976  McCurdy et al. .................... 525/53
4,321,344  3/1982  Sumitania et al. ................ 526/64

Primary Examiner—J. Ziegler
Attorney, Agent, or Firm—Antonelli, Terry & Wands

[57] ABSTRACT

High impact polystyrene having excellent properties is produced by a continuous process comprising feeding rubber and styrene continuously to a multistage horizontal dissolving tank to dissolve the rubber completely with stirring by increasing the temperature of each stage stepwise along the liquid flow direction, feeding the rubber solution to a first polymerizer to effect phase inversion of the rubber and preliminary polymerization of styrene; feeding the pre-polymerized solution to one or more horizontal type polymerizers to undergo bulk polymerization while removing the heat generated therein; and feeding the polymerized solution to a monomer separator to remove the remaining monomer.

7 Claims, 4 Drawing Figures

PROCESS FOR CONTINUOUS PRODUCTION OF HIGH IMPACT POLYSTYRENE

This invention relates to a process for continuous production of high impact polystyrene by bulk polymerization.

In the production of polymers from aromatic monovinyl compounds like styrene, particularly in large reactors, it is an important problem for obtaining a high-quality polymer to remove the generated heat including the heat of polymerization and the heat due to agitation and properly control thereby the polymerization temperature. Particularly in continuous bulk polymerization, because the viscosity of polymerization solution rapidly rises as the polymerization proceeds and this makes it extremely difficult to remove the heat from the solution, it has become a serious problem to control the solution temperature to be constant.

As regards methods for removing the heat from a highly viscous liquid, many proposals have so far been made. For example, Japanese Patent Appln Kokai (Laid-Open) No. 107395/74 discloses a method in which a non-solvent refrigerant different in density from the polymerization solution is admixed therewith by stirring to absorb the polymerization heat and other heat, then is separated from the polymerization solution with an aid of the density difference, withdrawn from the reactor, cooled, and returned to the reactor for recycling. However, according to this method, while the temperature of polymerization solution is easy to control, the separation of the refrigerant, which is preferably water, from the polymerization solution is difficult in practice, so that this method has a disadvantage of difficulty of stable continuous operations.

In contrast, there is a method comprising evaporating unreacted monomer or solvent from the polymerization solution while keeping the interior of reactor under reduced pressure, to remove the heat with an aid of its latent heat of evaporation. This method has a large capacity of heat removal and facilitates the control of liquid temperature, because the polymerization solution is directly cooled by utilizing the latent heat. However, this method is disadvantageous in that the polymerization solution is spattered by a foaming phenomenon which is caused by the evaporation at the inner region of the liquid under reduced pressure and adheres to the inner walls of the gas phase of the reactor, which results in giving bad influences to the quality of the polymerization solution by thermal deterioration and pyrolysis, and moreover the foaming reduces the volumetric efficiency of the reactor.

On the other hand, another method has been proposed which comprises, in the production of high impact polystyrene with rubber added to styrene monomer, weighing and feeding a pulverized rubber into a dissolving tank together with styrene, bulk polymerizing the solution in a polymerizer up to a conversion of 30–50%, and then subjecting it to suspension polymerization in another polymerizer. This method, however, has a disadvantage in that continuous operation thereof is infeasible because the dissolution of rubber in styrene is generally practiced batchwise by heating a mixture thereof from ordinary temperature in a rubber dissolver while stirring.

It is an object of this invention to provide a process for continuous production of a high impact polystyrene of superior quality, having a high impact resistance and containing a minimum amount of remaining monomer, by eliminating the above-mentioned disadvantages of the prior art process.

This invention provides a process for continuously producing a high impact polystyrene which comprises: a step of feeding rubber and sytrene monomer continuously to a multistage horizontal rubber dissolving tank to dissolve the rubber completely with stirring by increasing the temperature of each stage along the direction of the liquid flow; a step of feeding the rubber solution to a first polymerizer to effect phase inversion of the rubber and preliminary polymerization; a step of feeding the resulting preliminary polymerization solution to one or more horizontal polymerizers successively to undergo bulk polymerization while removing the heat; and a step of feedng the polymerization solution to a monomer separator to remove the remaining monomer.

Figure 2:
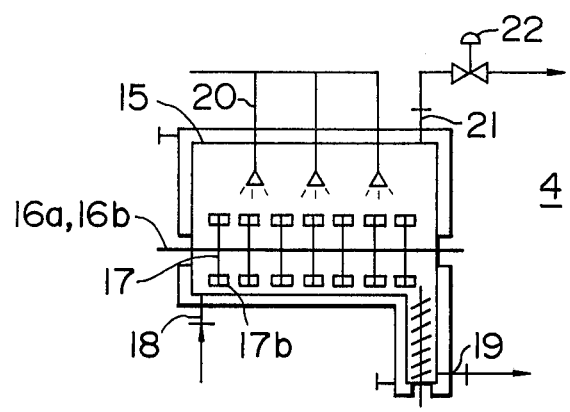
Figure 3:
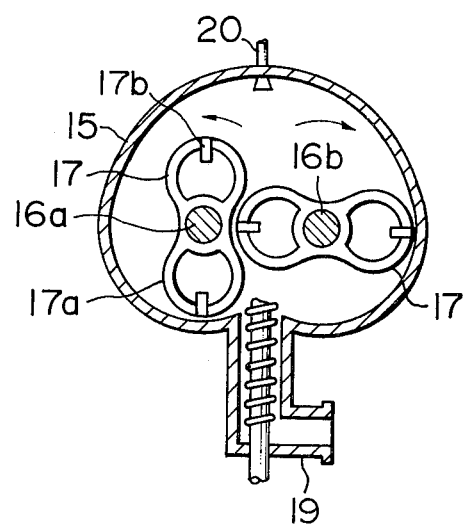
Figure 4:
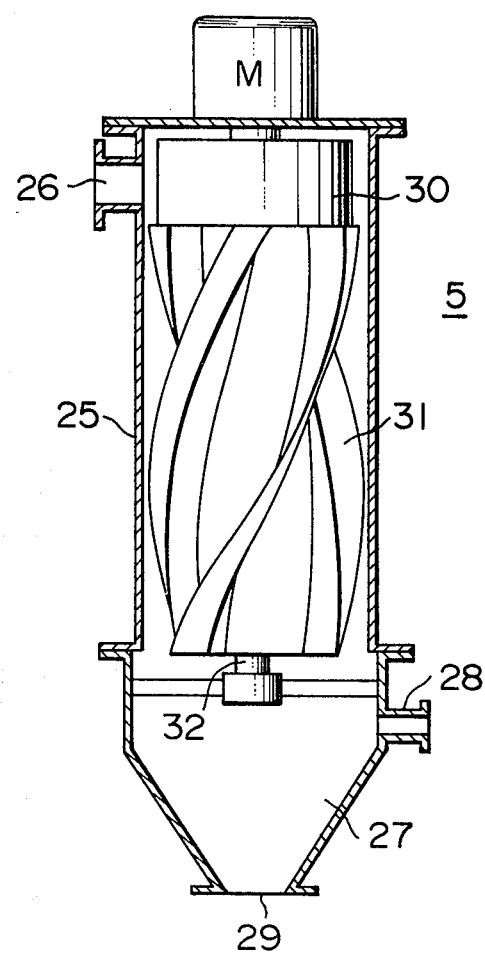

In the accompanying drawings, FIG. 1 is a flow diagram showing an embodiment of the continuous process for producing high impact polystyrene of this invention, FIG. 2 is an illustration of a horizontal polymerizer used as the final reactor, FIG. 3 is a vertical sectional and partly perspective view thereof, and FIG. 4 is a vertical sectional view of the monomer separator.

Referring now to FIGS. 1 to 4, an embodiment of this invention is explained below. In FIG. 1, numeral 1 denotes a multistage horizontal rubber dissolving tank equipped with a stirrer at each stage. This dissolving tank is operated under atmospheric pressure at temperatures raised stepwise from room temperature for the first stage up to the polymerization temperature for the final stage, for example, 20° to 40° C. and usually about 20° C. for the first stage, 40° to 60° C. (e.g. about 50° C.) for the second stage, and 80° to 110° C. (e.g. about 105° C.) for the third stage, wherein the residence time for each stage is about 1–2 hours. The number of stages in the dissolving tank is not limited to 3 as shown in FIG. 1 and 4 or 5 stages can also be employed preferably. In other words, the dissolving tank is designed so as to carry out such operations as the dissolution of rubber in styrene, the temperature rise and the heating of the resulting solution up to the polymerization temperature (but preferably not higher than 110° C.) in the usual bulk polymerization process along the direction of flow in the rubber dissolving tank 1.

Numeral 2 denotes a first polymerizer of multistage horizontal type having the same structure as the dissolving tank 1. This polymerizer is operated at temperatures of 100°–200° C., preferably 100°–130° C., under atmospheric pressure to effect the phase inversion of rubber and the preliminary polymerization. The conversion at the outlet of the first polymerizer 2 is controlled in the range of 25 to 40%, e.g. about 30%, and the polymerization heat is removed by use of an exterernal cooling jacket (not shown in the drawing).

Numeral 3 denotes a second polymerizer horizontally extended, through which a rotary shaft having a number of disk blades is longitudinally inserted. This polymerizer is operated at 100°–200° C., preferably 100°–150° C., under reduced pressure. The conversion at its outlet is controlled in the range of 45 to 65%, e.g. about 60%. Numeral 4 denotes a final polymerizer of horizontal type.

As shown in FIGS. 2 and 3, the horizontal type polymerizer such as the second and final polymerizer comprises a body portion 15 provided therearound with a heating and cooling means (usually a jacket heating and cooling means, not shown in the drawings), and there are provided in said body portion 15 a pair of shafts 16a, 16b, a plurality of 8-shaped stirring elements 17 each of which consists of an annular support plate 17a and scraper blades 17b, an inlet 18 for the polymerization solution to be treated, and an outlet 19. Said shafts 16a, 16b are provided horizontally along the longitudinal direction of the mixer body portion 15 as shown, and the annular support plates 17a are secured to said respective shafts 16a, 16b such that they are arranged symmetrical to each other in the direction vertical to said shafts. At both ends of each of said annular support plates 17a are provided the scraper blades 17b. Said support plate 17a and two scraper blades 17b constitute an 8-shaped stirring element 17. Said stirring elements 17 are provided in plurality in opposed relation to each other with a phase angle of 90° from one another. Also, said shafts 16a, 16b are so positioned that the ends of the respective stirring elements 17, will pass in close adjacency to the corresponding shafts 16b, 16a, when the shafts rotate, for example, as shown by the anows in FIG. 3. In FIG. 3, the inlet 18 is located at one end of the horizontally long body 15 and the outlet 19 at the other end thereof, numeral 20 denotes a plurality of nozzles for spraying a monomer for cooling fitted in the gas phase portion of the body 15 along the long direction and numeral 21 denotes a vent for volatile matter, located at the gas phase portion of the body, from which vaporized monomer is taken off through a pressure regulating valve 22. The horizontal type polymerizer 4 can be operated at 100°–230° C., preferably 100°–150° C., under atmospheric pressure to attain a conversion of about 70–85% at the polymerization solution outlet 19. Another horizontal type polymerizer having the same structure as mentioned above may be placed between the second and final polymerizers.

In FIG. 1, numeral 5 denotes a quick heating type monomer separator. As shown in FIG. 4 it comprises a cylindrical body 25 which is provided with an inlet 26 for the polymerization solution at an upper part of its wall, with a shearing heat generator type of flash heater 30 in the uppermost space therein, and thereunder, with a rotary shaft 32 supporting helical blades 31 having a narrow clearance against the inner wall, and connects at the lower end to a receiver tank 27, which is provided with a vent 28 for volatile matter at an upper part of its wall and with an outlet 29 for the polymerization solution at its bottom. The body 25 and the receiver tank 27 are operated under a vacuum of 200–0.5 torr. In FIG. 1, 6a–6c are condensers, 7a–7c vacuum pumps, 8a and 8b monomer tanks, 9a and 9b pumps for monomer feeding, 10 a die head, 11 a cooling bath, and 12 a chip cutter.

The process of this invention is, for example, carried out in the following manner.

A pulverized rubber and styrene monomer at ordinary temperatures are fed continuously into the rubber dissolving tank 1 and the temperature of the mixture is raised with stirring on every transfer to the next stage in the tank along the direction of the flow to dissolve the rubber completely. Examples of rubbers usable in this invention are polybutadiene, polyisoprene, a styrene-butadiene random copolymer (SBR), a styrene-butadiene bulk copolymer, chlorinated polyethylene, an ethylenevinyl acetate copolymer (EVA), an ethylene-propylenediene monomer terpolymer (EPDM), nitrile rubber (NBR), etc. The rubber and styrene are used in amounts of about 1 to 25% by weight of the former and about 99 to 75% by weight of the latter (i.e. rubber/styrene = 1/99–25/75 weight ratio).

The solution of rubber completely dissolved is fed to the first polymerizer 2, wherein the phase inversion of the rubber takes place and preliminary polymerization of styrene is conducted to attain a conversion of about 30%. In the first polymerizer 2, the polymerization heat and agitation heat can be readily removed by use of the external jacket (not shown) because the polymerization solution is not yet highly viscous.

The polymerization solution withdrawn from the first polymerizer 2 is fed into the second polymerizer 3, wherein it is polymerized to a conversion of about 60% at the outlet. The heat removal in the second polymerizer 3 is effected by the monomer spray onto the solution in the same manner (later, described in detail) as in the final polymerizer described above. The evaporated monomer is condensed in the condenser 6a, passed to the tank 8a and recycled by the pump 9a.

The polymerization solution, withdrawn from the second polymerizer 3 and fed into the final polymerizer 4 through the inlet 18, moves towards the outlet 19 while renewing its own surface constantly under the mixing and drawing actions of the stirring elements 17 rotating in opposite directions from the inner portion to the outer portion of the body 15 as shown in FIG. 3. Since any pair of opposite stirring elements 17, one being attached to the rotary shaft 16a and the other to 16b, have phases of rotation shifted from each other by 90 degrees, the polymerization solution in the polymerizer body 15 is stirred by the scraper blades 17b without leaving any dead space. In addition, the movement en masse of the solution is prevented by the drawing action due to the revolution of the stirring elements 17, the solution is kept in a perfect mixing state around the radius of the stirring element 17 even when the solution becomes highly viscous with the progress of polymerization. In order to control the polymerization temperature to a preset value in the body 15, the monomer is sprayed from a plurality of spray nozzles 20, which are fitted along the axial direction and correspond to the number of separated portions by the stirring elements 17, on to individual separated surfaces of the polymerization solution so as to remove the heat of polymerization and heat of agitation generated in individual portions separated by the stirring elements by the sensible heat and the latent heat of evaporation of a suitable amount of the monomer, and the pressure regulating valve 22 is handled so as to adjust the polymerization temperature to the same temperature as the boiling point of the sprayed monomer in said stage, whereby the monomer sprayed onto the polymerization solution is completely evaporated and the heat of polymerization and the agitation heat can be removed effectively. In this case, vaporization of the sprayed monomer only takes place and no evaporation occurs from the internal portion of the polymerization solution, and hence neither foaming phenomenon nor splashing phenomenon takes place. The monomer evaporated from the body 15 is then condensed at the condenser 6b, passed to the tank 8b and recycled by driving the pump 9b.

The polymerization solution retaining monomer about 15–30% by weight therein is withdrawn from the final polymerizer 4 and fed through the inlet 26 of the monomer separator 5 into its body 25. Then, the solution, after heated to a high temperature in a short time by receiving shearing force at the shearing heat generator type of flash heater, flows down while being pressed to the inner wall of the body 25 by the centrifugal force due to the revolution of the spiral blades 31, to be extended into a thin film, and at the same time repeating the renewal of its own surface by receiving an extruding action due to the revolution of the helical blades 31. Most of the remaining monomer in the polymerization solution is evaporated, taken off from the vent 25 for volatile matter, condensed at the condenser 6c, and returned to the rubber dissolution step for re-utilizing as the raw material styrene monomer.

The polymerization solution freed from monomer is withdrawn from the outlet 29 via the receiver tank 27 and is extruded in the form of strands through the die head 10, cooled in the cooling bath 11, and then taken as product chips through the chip cutter 12. Because the mean residence time of the polymer in the monomer separator 5 is short, thermal decomposition, chain scission, or degradation thereof with heat does not occur, so that a product excellent in quality can be obtained.

EXAMPLE

According to the process of this invention, continuous bulk polymerization for producing high impact polystyrene was carried out at a flow rate of 12 Kg/hr of a raw material rubber solution under the following operational conditions, and the following results were obtained as listed in Tables 1 and 2.

TABLE 1

| Operational conditions | First polymerizer 2 | Final polymerizer 4 | Monomer separator 5 |
| --- | --- | --- | --- |
| Mean residence time (hr) | 4.3 | 3.8 | — |
| Operational temperature (°C.) | 125 | 140 | 230 |
| Operational pressure (torr) | Atmospheric | Atmospheric | 1.8 |
| Conversion at outlet (%) | 30 | 80 | — |

TABLE 2

| Residual monomer in the product | (ppm) | 120 |
| --- | --- | --- |
| Rubber content in the product | (wt %) | 4 |
| Physical properties of the product | | |
| Tensile strength | (Kgf/cm$^2$) | 400 |
| Elongation | (%) | 20 |
| Izod impact strength | (Kg · cm/cm) | 6 |
| Heat distortion temperature | (°C.) | 100 |

As described hereinbefore, high impact polystyrene having excellent properties can be obtained according to this invention, because its process comprises continuous dissolution of rubber in styrene in a multi-stage horizontal dissolving tank, phase inversion of the rubber and preliminary polymerization of styrene in the first polymerizer, subsequent bulk polymerization thereof in one or more horizontal type polymerizers while removing the heat generated therein, and removal of the remaining monomer from the resulting polymerization solution by use of a monomer separator.

What is claimed is:

1. A process for continuously producing a high impact polystyrene which comprises:
    a step of feeding rubber and styrene monomer continuously to a multistage horizontal rubber dissolving tank to dissolve the rubber completely with stirring by increasing the temperature of each stage along the direction of the liquid flow therethrough to provide a rubber solution,
    a step of feeding the rubber solution to a first multistage horizontal type polymerizer operating at a temperature of from 100° to 200° C. to effect phase inversion of the rubber and preliminary polymerization of styrene, thereby providing a conversion of 25 to 40% by weight at the outlet of said first polymerizer,
    a step of feeding the resulting preliminary polymerized solution to one or more horizontal type polymerizers successively to undergo bulk polymerization at a temperature of from 100° to 230° C. while removing the heat generated therein by spraying styrene monomer over the exposed surface of the polymerization solution and evaporating the monomer to attain a conversion of about 70 to 85% by weight at the polymerization solution outlet of a final polymerizer, and
    a step of feeding the polymerization solution to a monomer separator to remove the remaining monomer.

2. A process according to claim 1, wherein the styrene monomer from the gas phase portion of the polymerizer is condensed and is returned to be sprayed on to the surface of the polymerization solution.

3. A process according to claim 1, wherein the monomer separator is a centrifugal-force thin film evaporator.

4. A process according to claim 1, wherein the rubber dissolving tank has three stages and the temperature in the first stage is 20° to 40° C., the temperature in the second stage is 40° to 60° C. and the temperature in the third stage is 80° to 110° C.

5. A process according to claim 1, wherein 2 or 3 horizontal type polymerizers are used as the second to final polymerizers.

6. A process according to claim 1, wherein the rubber is at least one member selected from the group consisting of a polybutadiene, polyisoprene, a styrene-butadiene random copolymer, a styrene-butadiene block copolymer, a chlorinated polyethylene, an ethylene-vinyl acetate copolymer, an ethylene-propylenediene terpolymer and nitrile rubber.

7. A process according to claim 1, wherein the weight ratio of the rubber to styrene is 1/99 to 25/75 in the rubber dissolving tank.

* * * * *